United States Patent
Horiyama

(10) Patent No.: US 8,472,058 B2
(45) Date of Patent: Jun. 25, 2013

(54) IMAGE PROCESSING DEVICE, IMAGE PROCESSING METHOD, AND PROGRAM

(75) Inventor: Jun Horiyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 12/756,179

(22) Filed: Apr. 8, 2010

(65) Prior Publication Data

US 2010/0265542 A1    Oct. 21, 2010

(30) Foreign Application Priority Data

Apr. 15, 2009   (JP) ................. 2009-099045

(51) Int. Cl.
*G06F 3/12*      (2006.01)
*G06K 15/00*    (2006.01)

(52) U.S. Cl.
USPC ....... 358/1.15; 358/1.12; 358/1.13; 358/1.14; 358/1.1; 399/82; 399/130

(58) Field of Classification Search
None
See application file for complete search history.

(56) References Cited

U.S. PATENT DOCUMENTS

| | | | |
|---|---|---|---|
| 6,226,097 B1 * | 5/2001 | Kimura | 358/1.14 |
| 6,937,355 B1 * | 8/2005 | Miyazawa et al. | 358/1.14 |
| 7,155,476 B2 | 12/2006 | Horiyama | |
| 7,383,321 B2 * | 6/2008 | Moyer et al. | 709/219 |
| 2003/0098989 A1 * | 5/2003 | Roos | 358/1.14 |
| 2005/0232656 A1 * | 10/2005 | Asai et al. | 399/130 |
| 2008/0049247 A1 * | 2/2008 | Asai et al. | 358/1.15 |
| 2008/0198404 A1 * | 8/2008 | Saito et al. | 358/1.15 |
| 2008/0260413 A1 * | 10/2008 | Kimura | 399/82 |
| 2009/0225354 A1 * | 9/2009 | Yonezawa | 358/1.15 |
| 2009/0316206 A1 * | 12/2009 | Anezaki et al. | 358/1.15 |

FOREIGN PATENT DOCUMENTS

JP   H08-293952 A   11/1996

* cited by examiner

*Primary Examiner* — Satwant Singh
(74) *Attorney, Agent, or Firm* — Fitzpatrick, Cella, Harper & Scinto

(57) ABSTRACT

The invention provides an image processing device capable of restarting a print job in process without involving a user when a network interruption in the course of receiving the print job is reconnected.

4 Claims, 12 Drawing Sheets

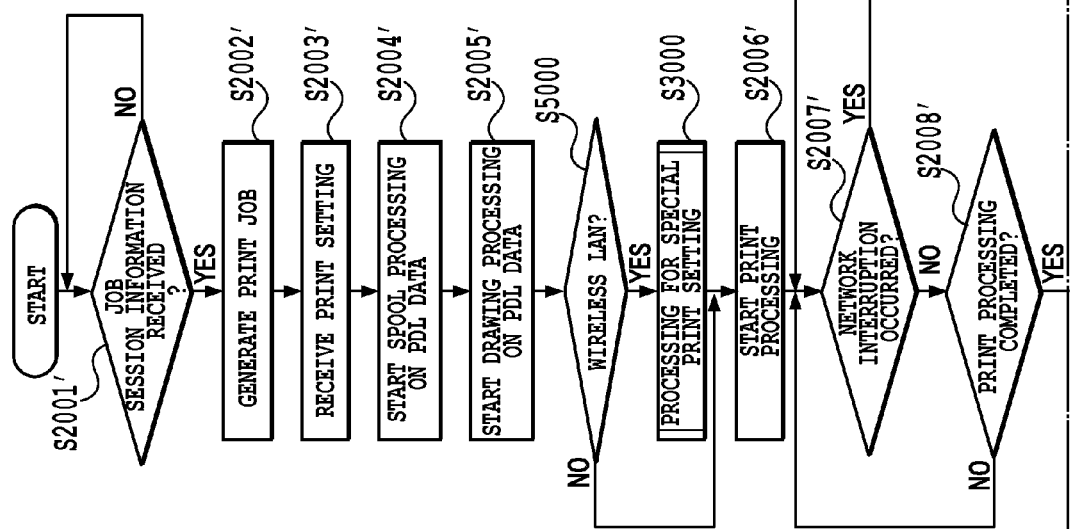

IMAGE PROCESSING DEVICE, IMAGE PROCESSING METHOD, AND PROGRAM

BACKGROUND OF THE INVENTION

1. Field of the Invention

The present invention relates to an image processing device, an image processing method, and a program.

2. Description of the Related Art

Conventionally, there are printing systems in which an external device such as a personal computer is connected to an image processing device through a wireless LAN or a wired LAN. External devices and image processing devices in a large number of printing systems operate as follows.

Specifically, the external device sends to the image processing device a print job that includes source data of a print image such as PDL (page description language) and print settings, and then the image processing device draws the print image according to the print settings and prints it on recording paper. When a failure occurs while the image processing device is processing the print job, a large number of image processing devices cancel the print job being processed.

However, when the cause of the failure can be removed, the printing processing may be able to be continued. Thus, there are proposed printing systems in which, when a failure occurs while an image processing device is processing a print job received from an external device, the image processing device stops the print job, and restarts the print job after the failure is resolved.

For example, Japanese Patent Laid-Open No. H08-293952 (1996) discloses how to cope with a situation where a facsimile starts receiving print data formed by an external device and then is powered off even while receiving the print data. After the facsimile is powered on again, a user selects, as a coping operation, one of operations of "redo", "restart", and "cancel" for send of the print data in the facsimile, and the facsimile performs processing in accordance with the selected operation.

As more and more external devices connected to image processing devices via networks are carried and the associated infrastructures are developed, printing systems have come to be widely used in which users traveling by foot, car, train and the like send a print job from an external device to the image processing device. However, in such cases, the networking is often interrupted by a factor on the side of the external device. Examples of the factor on the side of the external device include degraded radio condition of the network of the external device, a failure of an access point, the turning off of power, the suspending of the external device by the user and a lack of charge in the external device. As a result of this, the print job is often unsuccessfully completed. Thus, a printing system is required that stops the print job when the networking is interrupted by the factor on the side of the external device, and that can restart, after the network connection is achieved again, the print job from the state where the print job is stopped halfway through.

However, even a system disclosed in Japanese Patent Laid-Open No. H08-293952 (1996) is not capable of processing restart without involving a user. For this reason, in a conventional printing system, when the networking is interrupted by the factor on the side of the external device, an image processing device cancels a print job being processed. In order for the user to resend the print job, it is necessary for the user to confirm the reconnection of the network, specify the print job again and resend the print job as another print job; it is inconvenient, and needs time to resend the print job.

Meanwhile, if a network is interrupted while an image processing device is printing print data which are transmitted from an external device and have a setting such as stapling, punching or two-sided printing, the image processing device cannot process print data that are transmitted from another external device.

This problem occurs because a post-processing such as stapling or punching is performed after completion of print processing for the entire print data and a paper discharging process. Accordingly, if, while sheets of certain print data to be stapled or punched are being discharged to a paper tray, a sheet of other print data is discharged to the same paper tray, the sheets of the certain print data cannot be stapled or punched.

Meanwhile, in the case of two-sided printing, print processing is started after print data for a front face and a back face are received. Accordingly, the image processing device remains occupied if the network is interrupted when the image processing device only completes the reception of the print data for the front face. Hence the image processing device cannot process other print data.

SUMMARY OF THE INVENTION

In order to solve the above-described problems, an image processing device of the invention includes receiving unit for receiving print data transmitted from an external device connected through a network, unit for detecting interruption of the network connection while the receiving unit receives the print data, and setting determining unit for determining, before the detecting unit detects the interruption of the network, whether or not a print setting of the print data is a setting directed to start printing after all the print data are received. The image processing device is able to receive data failed to be received due to the interruption, among the print data supposed to be received, upon a reconnection of the network whose interruption has been detected. When the setting determining unit determines that the print setting of the print data is determined as the setting directed to start printing after all the print data are received, print processing on the print data is started after all the print data are received.

According to the present invention, when a network having been interrupted in the course of receiving a print job is reconnected, the print job in process is restarted without involving a user.

Further features of the present invention will become apparent from the following description of exemplary embodiments (with reference to the attached drawings).

BRIEF DESCRIPTION OF THE DRAWINGS

FIG. 11 is a diagram showing the relationship of FIGS. 11A and 11B;

FIG. 11A is a flowchart of an image processing device in the fifth embodiment.

DESCRIPTION OF THE EMBODIMENTS

The preferred embodiments of the present invention will be described below with reference to the accompanying drawings. The scope of the present invention is not limited to these embodiments.

First Embodiment

Figure 1:
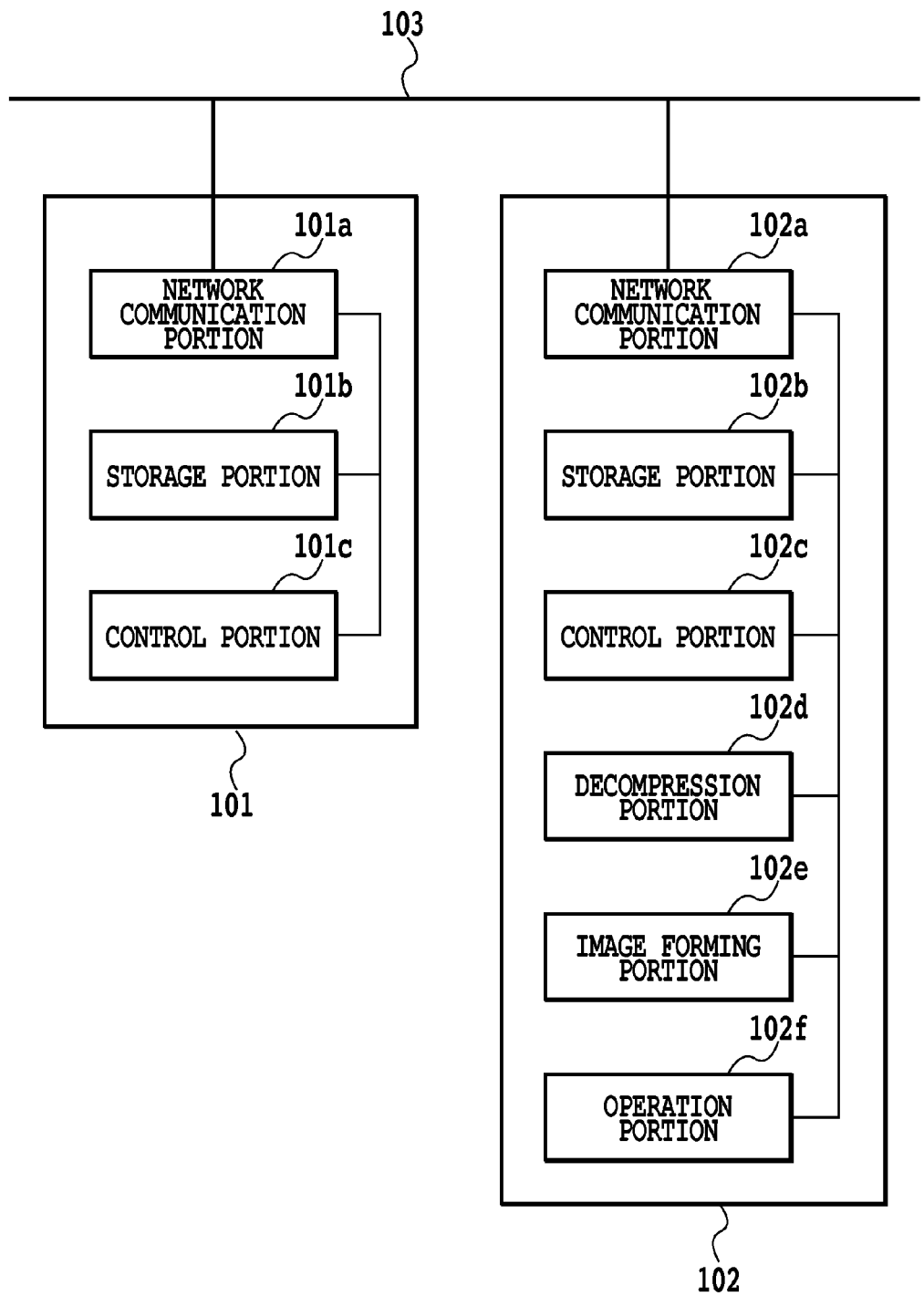
FIG. 1 is a diagram showing the configuration of a printing system.

FIG. 1 is a diagram showing an example of the entire configuration of a printing system of an embodiment of the present invention.

As shown in FIG. 1, in the printing system of this embodiment, an external device 101 such as a desk top PC, a notebook PC or a portable terminal and an image processing device 102 are connected together such that they can communicate with each other through a network 103. The network 103 may be directly connected through a wired LAN, a wireless LAN or the like or through the Internet.

The external device 101 is provided with a CPU, a ROM, a RAM, a HOD and the like; the CPU reads a program stored in the HDD into the RAM to perform it, and the external device 101 thereby achieves functions of individual portions.

A network communication portion 101a shown in FIG. 1 exchanges data with the image processing device 102.

A storage portion 101b is formed with the ROM, the RAM, the HDD and the like, and stores print data, information on print job and the like.

A control portion 101c is a control program that is performed by the CPU.

The control portion 101c generates the print data from a document produced by a user with a print application that operates on the external device. Here, the print data includes job session information, print settings and PDL data.

The control portion 101c performs control so as to store the print data in the storage portion 101b and to read the print data from the storage portion 101b and send the print data through the network communication portion 101a to the image processing device 102.

The control portion 101c also receives data from the image processing device through the network communication portion 101a, and controls the print job based on the content of the received data.

The image processing device 102 is provided with a CPU, a ROM, a RAM, a HDD and the like; the CPU reads a program stored in the HDD into the RAM to perform it, and thereby achieves functions of individual portions.

A network communication portion 102a shown in FIG. 1 exchanges data with the external device 101.

A storage portion 102b is formed with the ROM, the RAM, the HDD and the like, and stores print data, information on print job and the like.

When a control portion 102c receives the print data through the network communication portion 102a, the control portion 102c generates the print job based on job session information included in the print data, and stores the print settings and the print data in the storage portion 102b.

Then, the control portion 102c decompresses, at a decompression portion 102d, the PDL data included in the print data into image data that can be printed, and operates such that image forming (that is, print processing) is performed by an image forming portion 102e on recording paper according to the print settings.

As described above, the control portion 102c controls processing on the printing processing performed by the individual constituent portions.

An operation portion 102f receives user operations on the display (such as "under the reception", "under the operation" and "the completion of the printing") of the state of the print job and the print job. Examples of the user operations include the explicit stop of the print job and the cancellation of the print job, and the control portion 102c performs control according to input signals corresponding to the user operations.

Figure 2:
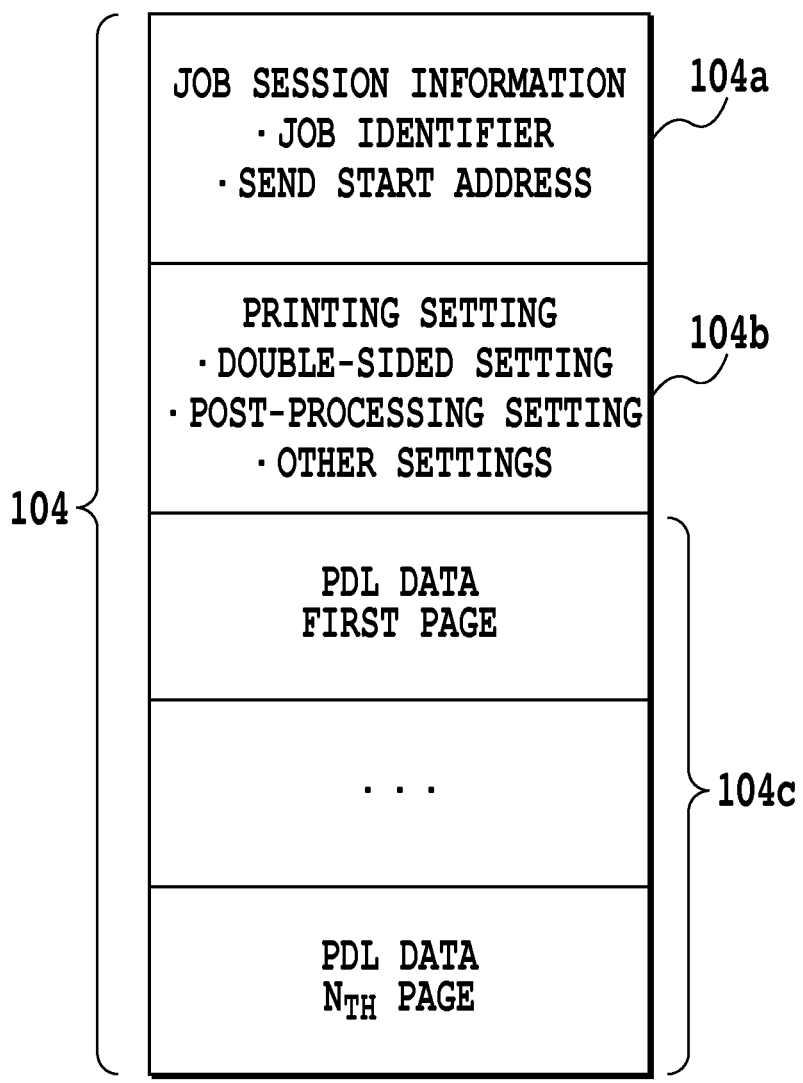
FIG. 2 is a diagram conceptually showing print data.

FIG. 2 is a diagram conceptually showing the print data 104.

In FIG. 2, the job session information 104a includes a job identifier that is the identifier of the print job and a send start address. The job identifier is generated by the control portion 101c of the external device 101, and is made correspond to the print job within the image processing device that is generated by the control portion 102c of the image processing device 102. The send start address is an address that indicates from which byte of the PDL data generated by the control portion 101c of the external device 101 the send is started.

The control portion 102c of the image processing device 102 reads the send start address, and thereby can determine from which byte the PDL data is sent from the external device 101. The print settings 104b indicate the settings of the print job, and specifies, for example, one-sided or double-sided printing, post-processing (such as stapling and punching) and a color mode (black and white printing or color printing).

The PDL data 104c is data obtained by the conversion of a document produced by the user into PDL, and this conversion is performed by the control portion 101c of the external device 101 with the print application; the decompression portion 102d of the image processing device 102 converts the PDL data 109c into image data that can be printed.

Figure 3:
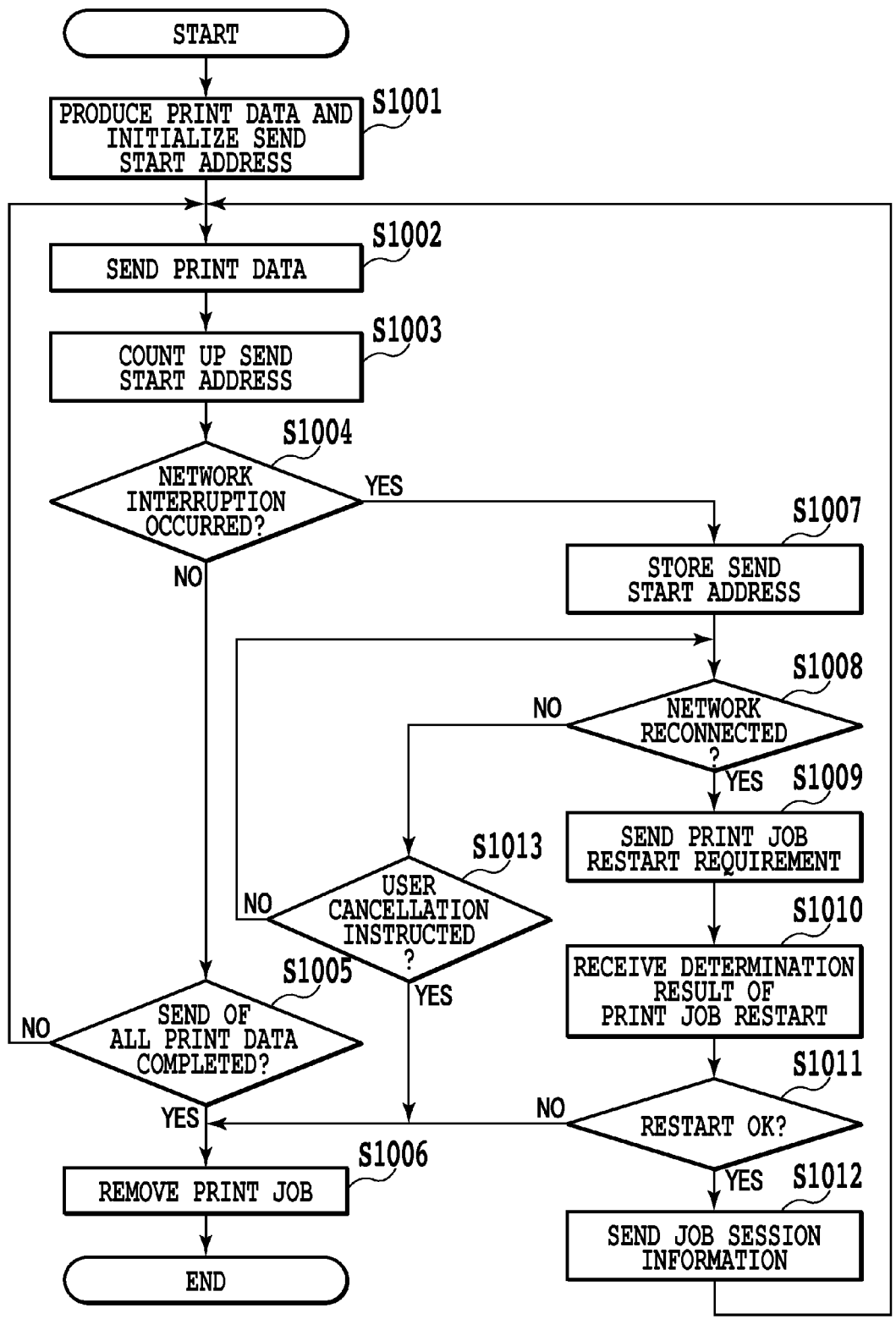
FIG. 3 is a flowchart of processing performed by an external device in the first and second embodiments.

FIG. 3 is a flowchart showing the control of the control portion 101c that is performed by the CPU of the external device 101 in the embodiments of the present invention.

In step S1001, when the user gives an instruction to perform printing through the unillustrated print screen of the print application, the control portion 101c generates the print data. The control portion 101c generates the job identifier included in the job session information, and initializes the send start address included in the job session information to zero.

The send start address being zero means that the send to the image processing device 102 is started from the front end of the PDL data. The control portion 101c also stores the job session information in the storage portion 101b.

Then, in step S1002, the control portion 101c starts the send of the print data through the network communication portion 101a to the image processing device 102. Here, the control portion 101c reads and sends, from the storage portion 101b, the send start address on the PDL data included in the print data.

Then, in step S1003, the control portion 101c counts up the send start address by the size of the PDL data sent, and stores the resulting address in the storage portion 101b. In other words, the send start address is determined according to the size of the PDL data that have been sent. The send start address is counted up by the size of the sent PDL data in this way, and thus the external device 101 can hold information indicating what pieces of the PDL data have been sent.

Then, in step S1004, the control portion 101c determines whether or not the network is interrupted in the network communication portion 101a. In this embodiment, the network communication portion 101a is assumed to determine the occurrence of the interruption of the network by detecting the logical interruption of a communication protocol such as TCP/IP. However, the method of making the determination is not limited to this method, and any suitable method may be employed. In the following description, the same is true.

If the interruption of the network does not occur, the process proceeds to step S1005, whereas, if the interruption of the network occurs, the process proceeds to step S1007.

In step S1005, whether or not all the print data is sent by the control portion 101c to the image processing device 102 is determined.

If all the data is not sent, the process proceeds to step S1002, whereas, if all the data is sent, the process proceeds to step S1006.

In step S1006, the control portion 101c performs control so as to eliminate the print job by eliminating the job session and the print data stored in the storage portion 101b.

If the interruption of the network occurs in step S1004, and the process proceeds to step S1007, in step S1007, the control portion 101c stops the send of the print data and stores, as the send start address, the address of the PDL data at the time of the occurrence of the interruption of the network in the storage portion 101b. The send start address is stored in this way, and thus it is possible for the external device 101 to hold information indicating the send start position that is used when unsent data among the print data is sent later to the image processing device 102.

Then, the process proceeds to step S1008 where the control portion 101c determines whether or not the network is reconnected through the network communication portion 101a. If the network is not reconnected, the process proceeds to step S1013.

In step S1013, the control portion 101c determines whether or not the user explicitly gives an instruction to cancel the print job through an unillustrated cancellation instruction screen.

If the cancellation instruction is not given, the process proceeds to step S1008, whereas, if the cancellation instruction is given, the process proceeds to step S1006.

If, in step S1008, the network is reconnected, the process proceeds to step S1009. In step S1009, the control portion 101c sends a print job restart requirement to the image processing device 102. Here, the print job restart requirement includes the job session information of the print job, and the control portion 102c of the image processing device 102 can specify, based on the job identifier included in the job session information, the print job that is required to restart.

Then, in step S1010, the control portion 101c receives, as a response, from the image processing device 102, through the network communication portion 101a, the result obtained by determining whether or not the print job specified by the job session information of the print job restart requirement is restarted.

Then, in step S1011, if the control portion 101c determines that the print job can be started, the process proceeds to step S1006, whereas, if the control portion 101c determines that the print job cannot be started, the process proceeds to step S1012. The restart determination result of the print job will be described later when a description is given with reference to FIG. 4.

In step S1012, the control portion 101c reads the job session information stored in the storage portion 101b in step S1001, and sets the send start address stored in the storage portion 101b in step S1007 as the send start address included in the job session information. Then, the control portion 101c sends the updated job session information to the image processing device 102 through the network communication portion 101a, and the process proceeds to step S1002. In step S1002, the control portion 101c sends, to the image processing device 102, through the network communication portion 101a, the print data including the portion of the PDL data that starts from the position indicated by the send start address.

In this way, the external device 101 can stop the send of the print data when the network is interrupted by a factor on the side of the external device, and can restart the send of the print data halfway therethrough when the network is reconnected.

Figure 4:
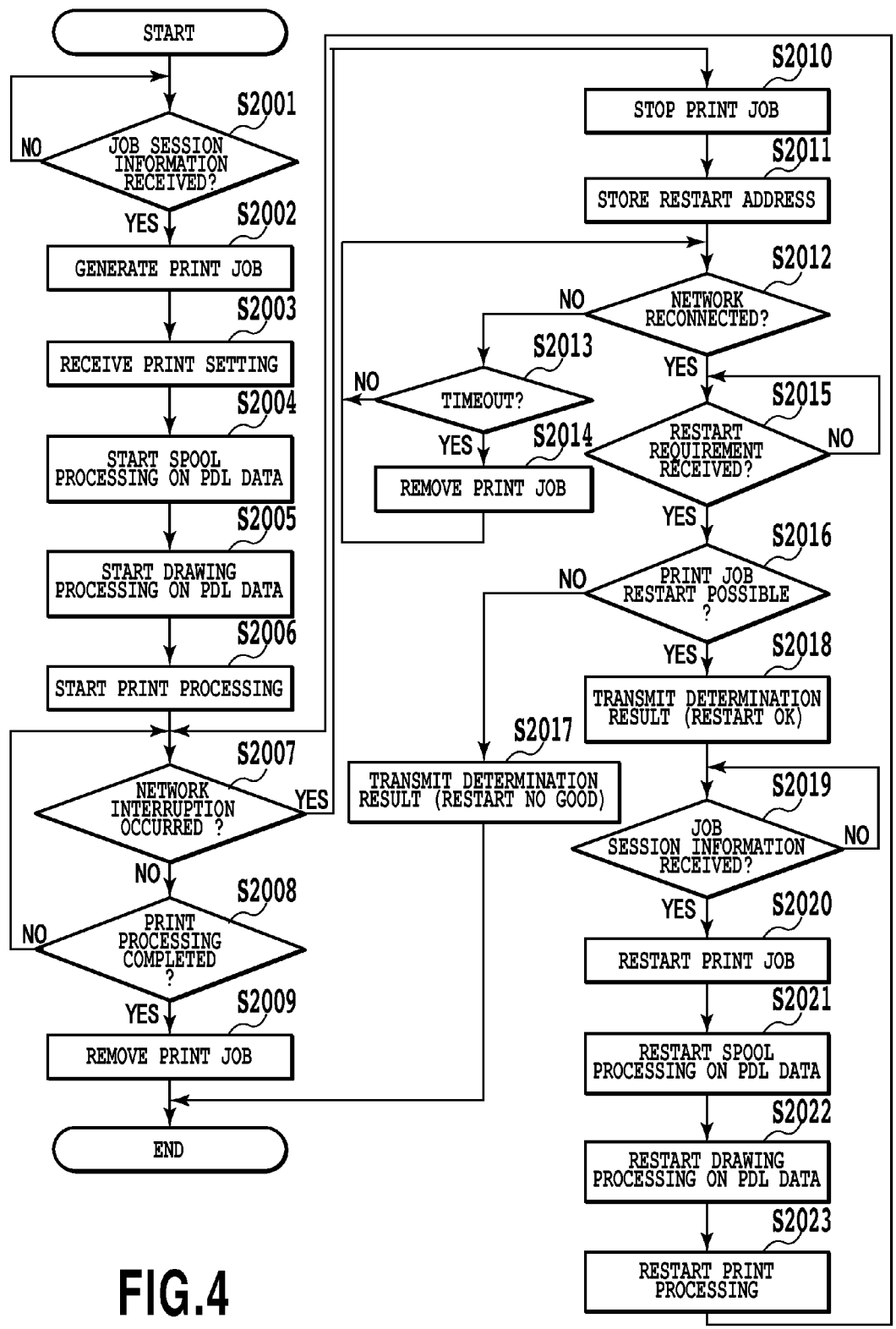
FIG. 4 is a flowchart of processing performed by and image processing device in the first and second embodiments.

FIG. 4 is a flowchart showing the control of the control portion 102c that is performed by the CPU of the external device 102 in the embodiments of the present invention.

In step S2001, the control portion 102c determines whether or not the job session information is received from the external device 101 through the network communication portion 102a.

If the job session information is received, the process proceeds to step S2002 where the control portion 102c generates the print job corresponding to the job identifier included in the received job session information and stores it in the storage portion 102b. The control portion 102c stores the job session information in the storage portion 102b.

Then, in step S2003, the control portion 102c receives the print settings through the network communication portion 102a and stores them in the storage portion 102b.

Then, in step S2004, the control portion 102c performs control such that the PDL data of the print job included in the print data 104 received through the network communication portion 102a is started to be spooled in the storage portion 102b.

Then, the process proceeds to step S2005 where the control portion 102c performs control such that the PDL data of the print job is read from the storage portion 102b, it is converted, by the decompression portion 102d, into image data that can be printed and drawing is started.

Then, the process proceeds to step S2006 where the control portion 102c controls the image forming portion 102e such that the printing of the image data resulting from the conversion by the decompression portion 102d is started. Here, the spooling processing, the drawing processing and the printing processing described above can be performed asynchronously. Specifically, the decompression portion 102d repeats the drawing processing until the PDL data stored in the storage portion 102b is read and then the generation of all the image data is completed, and the image forming portion 102e repeats the printing processing until the printing of all the image data generated by the storage portion 102b on recording paper is completed.

Then, the process proceeds to step S2007 where the control portion 102c determines whether or not the interruption of the network occurs in the network communication portion 102a. The decision is made by the detection of the logical interruption of a communication protocol such as TCP/IP by the network communication portion 102a.

If the interruption of the network does not occur, the process proceeds to step S2008, whereas, if the interruption of the network occurs, the process proceeds to step S2010.

In step S2008, the control portion 102c determines whether or not the printing of all the image data of the print job is completed in the image forming portion 102e.

If the printing is not completed, the process proceeds to step S2007, whereas, if the printing is completed, the process proceeds to step S2009.

In step S2009, the control portion 102c performs control so as to eliminate the print job by eliminating the job session information and the print settings stored in the storage portion 102b.

If, in step S2007, the interruption of the network occurs, and the process proceeds to step S2010, in step S2010, the control portion 102c stops the print job. The control portion 102c performs control such that information for identifying the print job corresponding to the job identifier included in the job session information and the print settings are stored in the storage portion 102b. Furthermore, the control portion 102c performs control such that the spool processing started in step S2004, the drawing processing started in step S2005 and the printing processing started in step S2006 are stopped.

Then, the process proceeds to step S2011 where the control portion 102c stores a restart address in the storage portion 102b. The restart address refers to a read address of the PDL data that the decompression portion 102d reads from the storage portion 102b after the reconnection of the network. The restart address is stored in this way, and thus the image processing device 102 can hold the information indicating the start position to restart the processing.

Figure 5:
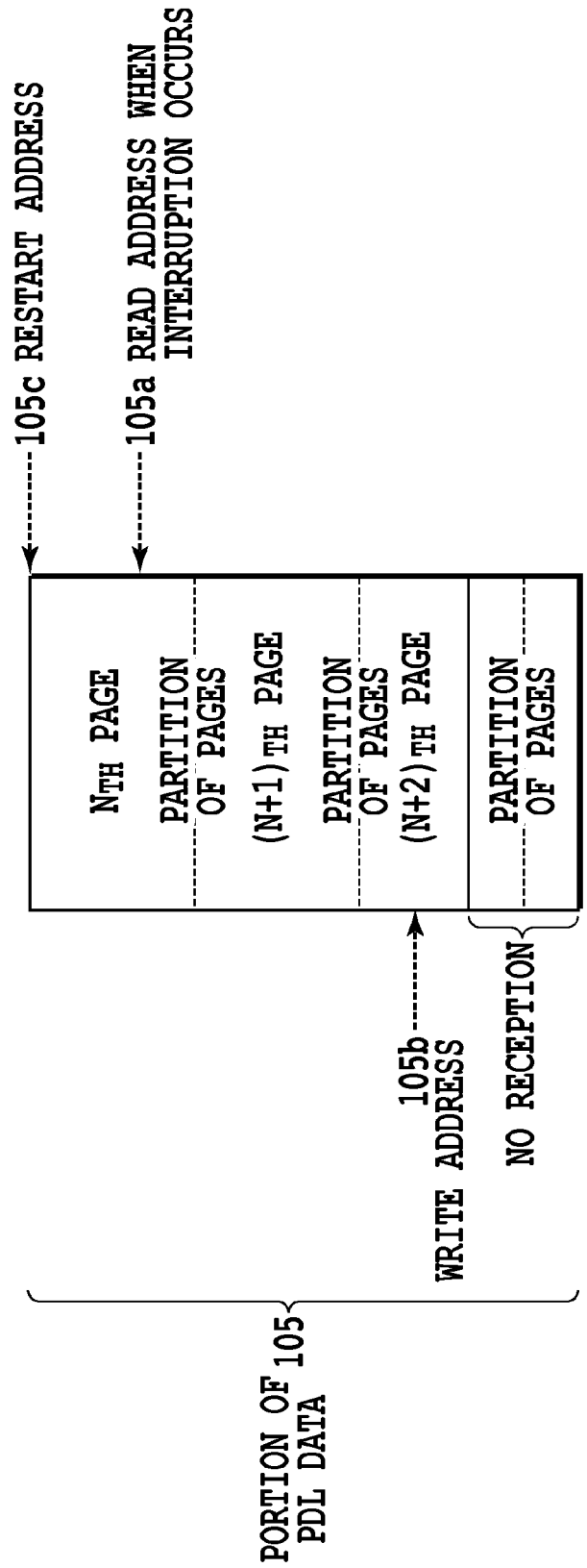
FIG. 5 is a diagram showing a restart address in the first embodiment.

FIG. 5 is a diagram showing the restart address in this embodiment.

A PDL data portion 105 refers to a portion of the PDL data that is stored in the storage portion 102b. A read address 105a at the time of the occurrence of the interruption refers to the address of the PDL data that is being read by the decompression portion 102d from the storage portion 102b when the decompression portion 102d is in the middle of drawing the Nth page at the time of the occurrence of the interruption of the network. A write address 105b refers to an address, of the PDL data received by the network communication portion 102a, that has been completely stored in the storage portion 102b. When, after the occurrence of the interruption of the network, there is some PDL data that is received by the network communication portion 102a and that is not stored in the storage portion 102b, the control portion 102c stores, in the storage portion 102b, the PDL data that is not stored in the storage portion 102b.

In FIG. 5, the restart address 105c that is stored in the storage portion 102b at the time of the occurrence of the interruption of the network is set at an initial address of the PDL data of the Nth page that is being drawn by the decompression portion 102d and that is before being printed. The restart address 105c is calculated with both the send start address included in the job session information received in step S2001 and the size of the PDL data that has already been read by the decompression portion 102d from the storage portion 102b. The reason why the restart address 105c is set at such a position is as follows. If the control portion 102c stops the print job while the decompression portion 102d is drawing the Nth page, memory necessary to draw one page by the decompression portion 102d cannot be released before the restart of the print job. Consequently, in the image processing device having only a small amount of memory, the efficiency with which the memory is used is reduced. After the control portion 102c of the image processing device 102 restarts the print job, the decompression portion 102d reads the above-mentioned restart address from the storage portion 102b and performs the restart. Then, the decompression portion 102d operates so as to remove drawing data of the Nth page, which is in the middle of being drawn. The image forming portion 102e prints, on the recording paper, all the image data that had been drawn by the decompression portion 102d before the interruption of the network.

After the control portion 102c stores the restart address in the storage portion 102b in step S2011 shown in FIG. 4, the process proceeds to step S2012.

In step S2012, the control portion 102c determines whether or not the network is reconnected.

If the network is not reconnected, the process proceeds to step S2013, whereas, if the network is reconnected, the process proceeds to step S2015.

In step S2013, the control portion 102c determines whether or not a predetermined time period has elapsed (timeout) since the interruption of the network. The predetermined time period may be previously input from an unillustrated operation portion setting screen and stored in the storage portion 102b or may be statically coded in a program.

If the timeout does not occur in step S2013, the process proceeds to step S2012, whereas, if the timeout occurs (if the communication is not restarted after the predetermined time period has elapsed), the process proceeds to step S2014.

In step S2014, the control portion 102c performs control so as to remove the print job, and then the process proceeds to step S2012. If, in step S2012, the control portion 102c determines that the network is reconnected, the process proceeds to step S2015.

In step S2015, the control portion 102c determines whether or not the network communication portion 102a receives the print job restart requirement (S1009 shown in FIG. 3) transmitted from the external device 101.

The print job restart requirement includes the job session information, and the control portion 102c reads the job identifier included in the job session information and can thereby determine which print job among print jobs that are stopped is required to be restarted. If the print job restart requirement is received, the process proceeds to step S2016.

In step S2016, the control portion 102c determines whether or not the print job specified by the job restart requirement can be restarted. Specifically, if, in step S2014, the control portion 102c does not remove the print job, the control portion 102c determines that the print job can be restarted, whereas, if the control portion 102c removes the print job, the control portion 102c determines that the print job cannot be restarted.

If the print job cannot be restarted, the process proceeds to step S2017, whereas, if the print job can be restarted, the process proceeds to step S2018.

In step S2017, the control portion 102c transmits, to the external device 101, the determination result indicating that the print job cannot be restarted.

In step S2018, the control portion 102c transmits, to the external device 101, the determination result indicating that the print job can be restarted, and the process proceeds to step S2019.

In step S2019, the control portion 102c determines whether or not the network communication portion 102a receives the job session information from the external device 101.

If the job session information is received, the process proceeds to step S2020 where the control portion 102c performs control so as to restart the print job specified by the job identifier included in the job session information.

Then, the process proceeds to step S2021 where the control portion 102c performs control so as to restart the spool processing on the PDL data. Here, when the control portion 102c receives the PDL data preceding the write address at the time of stop of the print job (determined from the send start address within the job session information), the control portion 102c performs control so as not to store the received data preceding the write address in the storage portion 102b twice.

Then, the process proceeds to step S2022 where the control portion 102c performs control such that the decompression portion 102d restarts the drawing processing. Here, the decompression portion 102d reads, from the storage portion 102b, the restart address at the time of stop of the print job, and reads, from the restart address, the PDL data stored in the storage portion 102b.

Then, the process proceeds to step S2023 where the control portion 102c performs control such that the image forming portion 102e restarts the printing processing (print processing), and the process proceeds to step S2007.

In this way, when the network is interrupted by a factor on the side of the external device, the image processing device 102 can stop the print job, and, when the network is reconnected, the image processing device 102 can restart, from the middle of the print data, the reception of the print data from the external device 101.

With the printing system utilizing the external device 101 and the image processing device 102 described above, it is possible to stop the print job even when the network is interrupted by a factor on the side of the external device and to restart, when the network is reconnected, the print job from the middle thereof without the user being involved. Thus, it is possible to enhance the convenience of the user. Moreover, since, after the reconnection of the network, the send of the print data that has not been sent is restarted from the external device, it is possible to reduce the time period necessary to transfer data when the print job is restarted.

Second Embodiment

The overall configuration of a printing system in the second embodiment is the same as in the first embodiment. The second embodiment differs from the first embodiment in the method of setting the restart address when the network is interrupted. The second embodiment will be described below with reference to FIG. 6.

Figure 6:
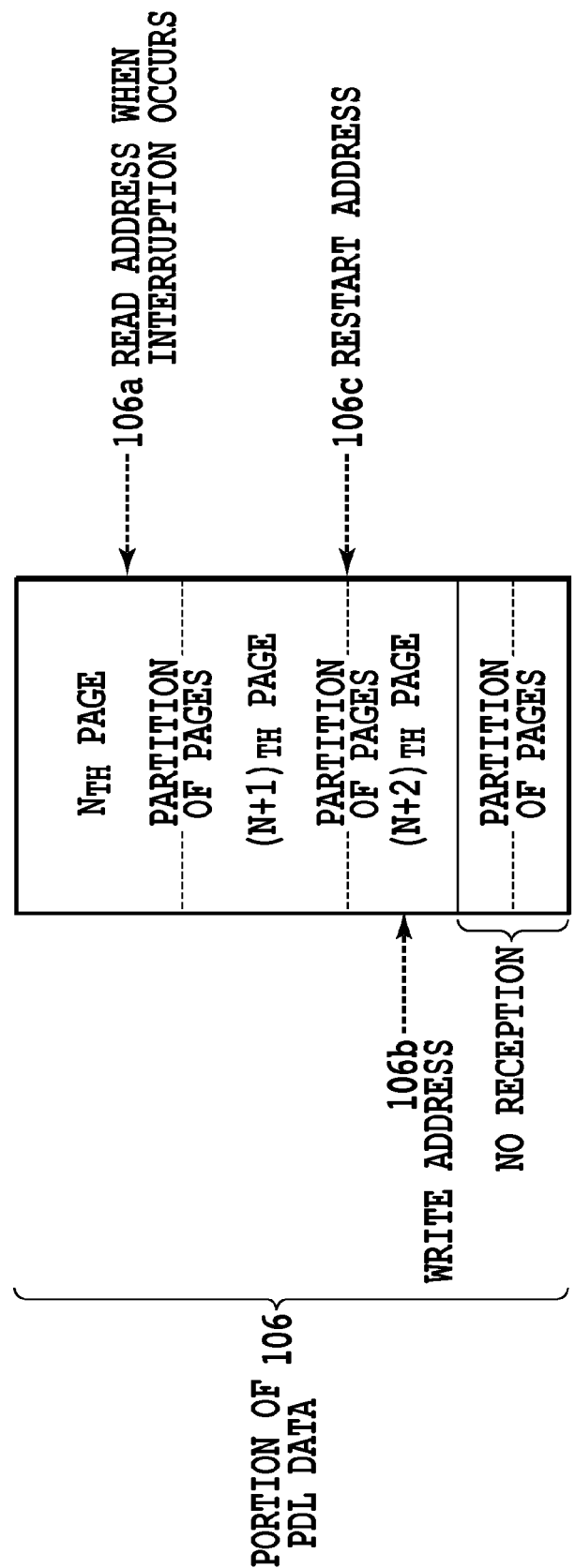
FIG. 6 is a diagram showing a restart address in the second embodiment.

In FIG. 6, a PDL data portion 106 refers to a portion of the PDL data that is stored in the storage portion 102b. A read address 106a at the time of the occurrence of the interruption refers to the address of the PDL data that is being read by the decompression portion 102d from the storage portion 102b when the decompression portion 102d is in the middle of drawing the Nth page at the time of the occurrence of the interruption of the network. A write address 106b refers to an address, of the PDL data received by the network communication portion 102a, that has been completely stored in the storage portion 102b. In the second embodiment, the decompression portion 102d continues to perform the drawing processing even when the interruption of the network occurs. A restart address 106c that is stored in the storage portion 102b at the time of the occurrence of the interruption of the network is set at an initial address of the PDL data of the (N+2)th page that has not been completely drawn because the decompression portion 102d insufficiently receives the PDL data. Then, the decompression portion 102d operates to remove, from the decompression portion 102d, the drawing data of a portion of the (N+2)th page that cannot be drawn because the decompression portion 102d insufficiently receives the PDL data. After the reconnection of the network, the decompression portion 102d reads the above-described restart address from the storage portion 102b and performs the restart. At the time of the occurrence of the interruption of the network, the image forming portion 102e prints, on the recording paper, all the image data that has been drawn by the decompression portion 102d.

In this way, it is possible to reduce, as compared with the first embodiment, the number of pages that need to be drawn by the decompression portion 102d after the control portion 102c of the image processing device 102 restarts the print job, and this makes it possible to reduce a time period until the completion of the printing. Although the method of setting the restart address is specifically described in the first and second embodiments, the method of setting is not limited to these methods.

As described above, with this embodiment, it is possible for the image processing device to stop the print job even when the network is interrupted by a factor on the side of the external device, and it is possible for the external device to restart, when the network is reconnected, the print job from the middle thereof without the user being involved. Consequently, it is possible for the image processing device and the external device to enhance the convenience of the user. Moreover, since, after the reconnection of the network, the external device restarts the send of the print data that has not been sent from the external device, it is also possible to reduce the time period necessary to transfer data when the print job is restarted.

Third Embodiment

A printing system according to a third embodiment is similar to the printing system of the first embodiment. The third embodiment applies an individual processing method by way of the print setting of the print data 104 before the print processing is started, which is different from the first embodiment. In the following, the individual processing method by way of the print setting of the print data 104 before the print processing is started will be described with reference to FIG. 7 and FIG. 8.

Figure 7:
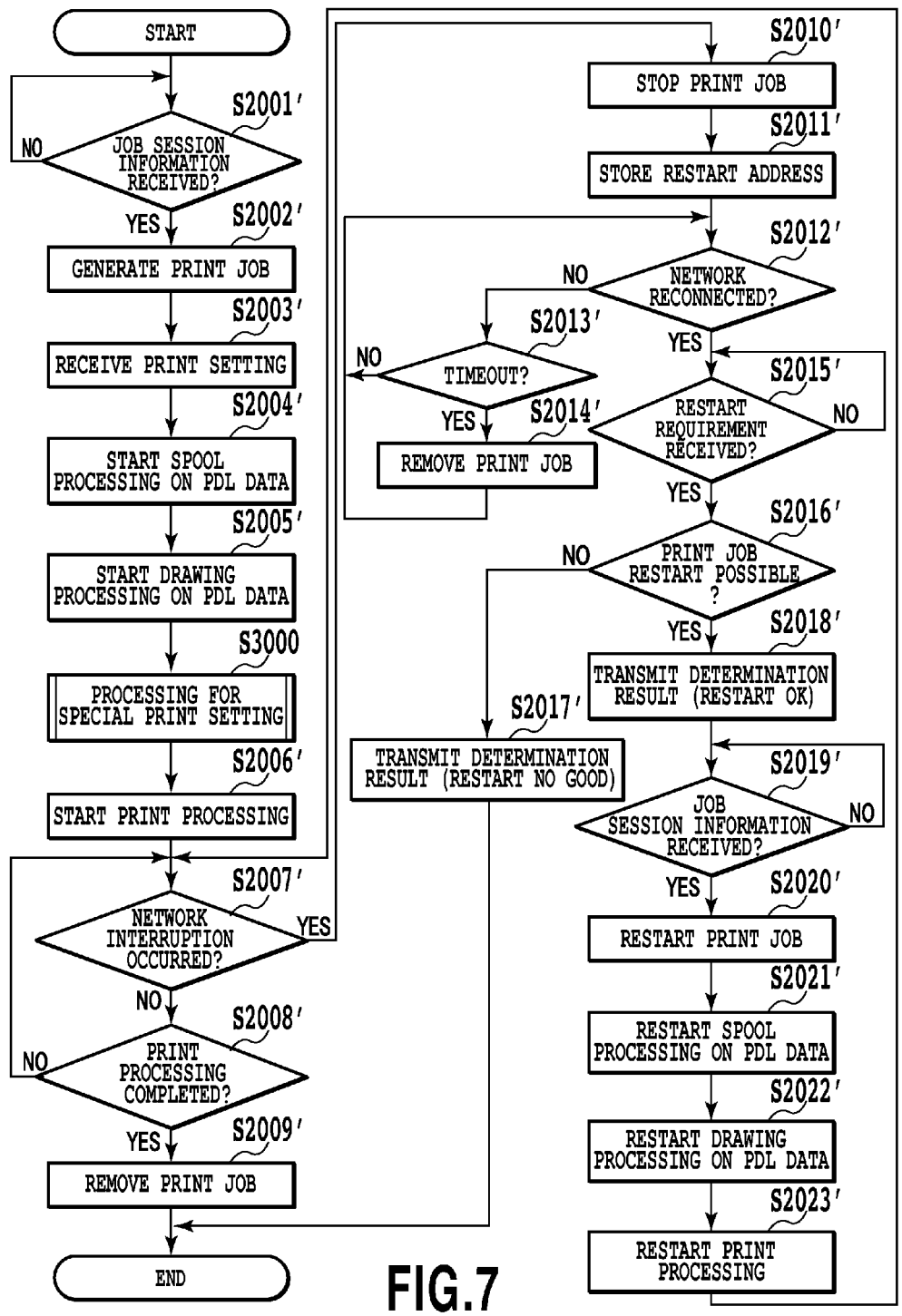
FIG. 7 is a flowchart of an image processing device in the third embodiment.

FIG. 7 is a flowchart arranged by adding, to the flowchart in FIG. 4, individual processing step S3000 by way of setting up the print data 104 before the print processing is started. The processings other than step S3000 are the same as those in FIG. 4.

Figure 8:
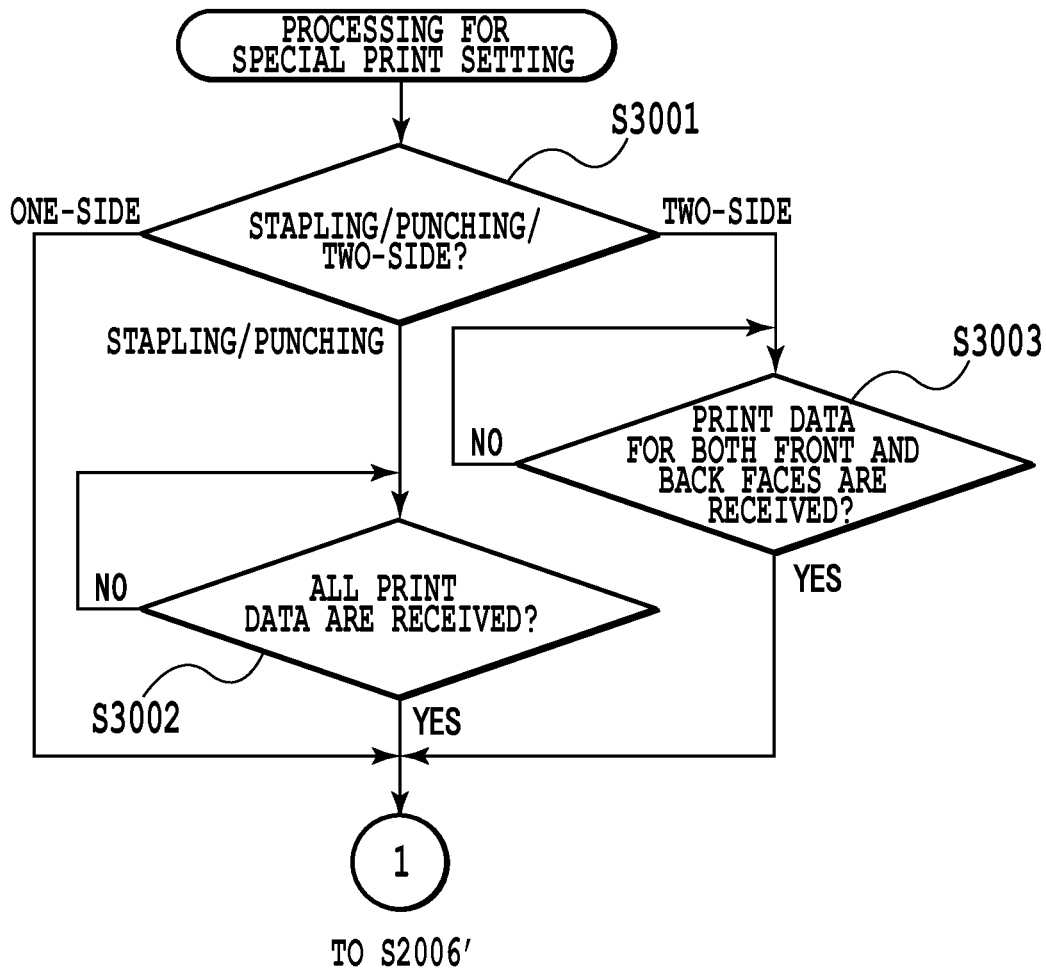
FIG. 8 is another flowchart of the image processing device in the third embodiment.

FIG. 8 is a flowchart showing an example of the processing in step S3000 in FIG. 7.

First, in step S3001 in FIG. 8, the image processing device 102 determines which kind of print setting is made for the print data 104 being transmitted from the external device 101 to the image processing device 102.

The process proceeds to step S3002 when a determination is made in step S3001 that the print setting is directed to start printing after the image processing device 102 receives all the print data. Here, the setting directed to start printing after the image processing device 102 receives all the print data is print setting that requires stapling and punching, for example.

On the other hand, the process proceeds to step S3003 when a determination is made in step S3001 that the print setting is directed to start printing after the image processing device 102 receives the print data per specific portion. Here, the setting directed to start printing after the image processing device 102 receives the print data per specific portion is a print setting for two-sided printing, for example.

Meanwhile, when a determination is made in step S3001 that the print setting is directed to start printing simultaneously with reception of the print data by the image processing device 102, after the processing in FIG. 8 is performed and then the process proceeds to step S2006'. Here, the setting directed to start printing simultaneously with reception of the print data by the image processing device 102 is print setting for one-sided printing, for example.

In step S3002, the image processing device 102 determines whether or not all the print data are received.

The processing in FIG. 8 is completed when a determination is made in step S3002 that all the print data are received, and then the process proceeds to step S2006'.

On the other hand, if a determination is made in step S3002 that all the print data are not received, then the processing in step S3002 will be repeated.

In step S3003, the image processing device 102 determines whether or not the print data per specific portion is received. Here, the print data per specific portion represents print data for a front face and print data for a back face in the case of two-sided printing, for example.

The processing in FIG. 8 is completed when a determination is made in step S3003 that the print data per specific portion is received, and then the process proceeds to step S2006'.

On the other hand, if a determination is made in step S3003 that the print data per specific portion is not received, then the processing in step S3003 will be repeated.

According to the above-described processing, the image processing device 102 is able to automatically select and perform an appropriate restarting method of printing the print data in accordance with the print setting specified by the external device 101 after reconnection of the network.

Therefore, when the processing unable to perform without all the print data is specified, the specified processing will be performed when all the print data are provided after the network is reconnected.

Moreover, the image processing device 102 is able to automatically select and perform an appropriate restarting method of printing print data received from another external device (not shown) after reconnection of the network.

Fourth Embodiment

A printing system according to a fourth embodiment is similar to the printing system of the first embodiment. The fourth embodiment applies an individual processing method by way of setting the print data 104 in a period from occurrence to recovery of network interruption, which is different from the first embodiment. In the following, the individual processing method by way of setting the print data 104 in a period from occurrence to recovery of network interruption will be described with reference to FIG. 9 and FIG. 10.

Figure 9:
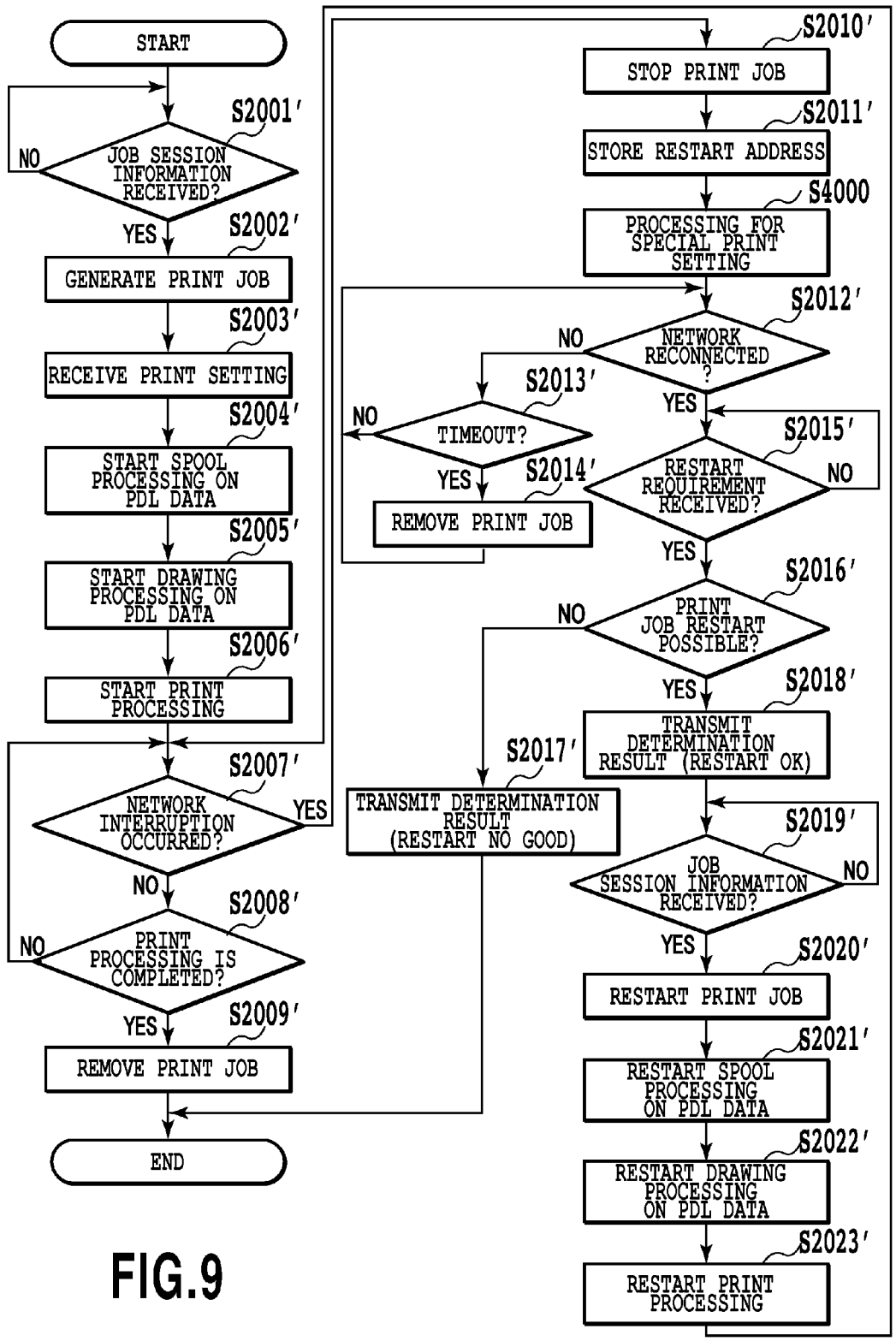
FIG. 9 is a flowchart of an image processing device in the fourth embodiment.

FIG. 9 is a flowchart arranged by adding, to the flowchart in FIG. 4, individual processing step S4000 by way of setting the print data 104 in a period from occurrence to recovery of network interruption. The processings other than step S3000 are the same as those in FIG. 4.

Figure 10:
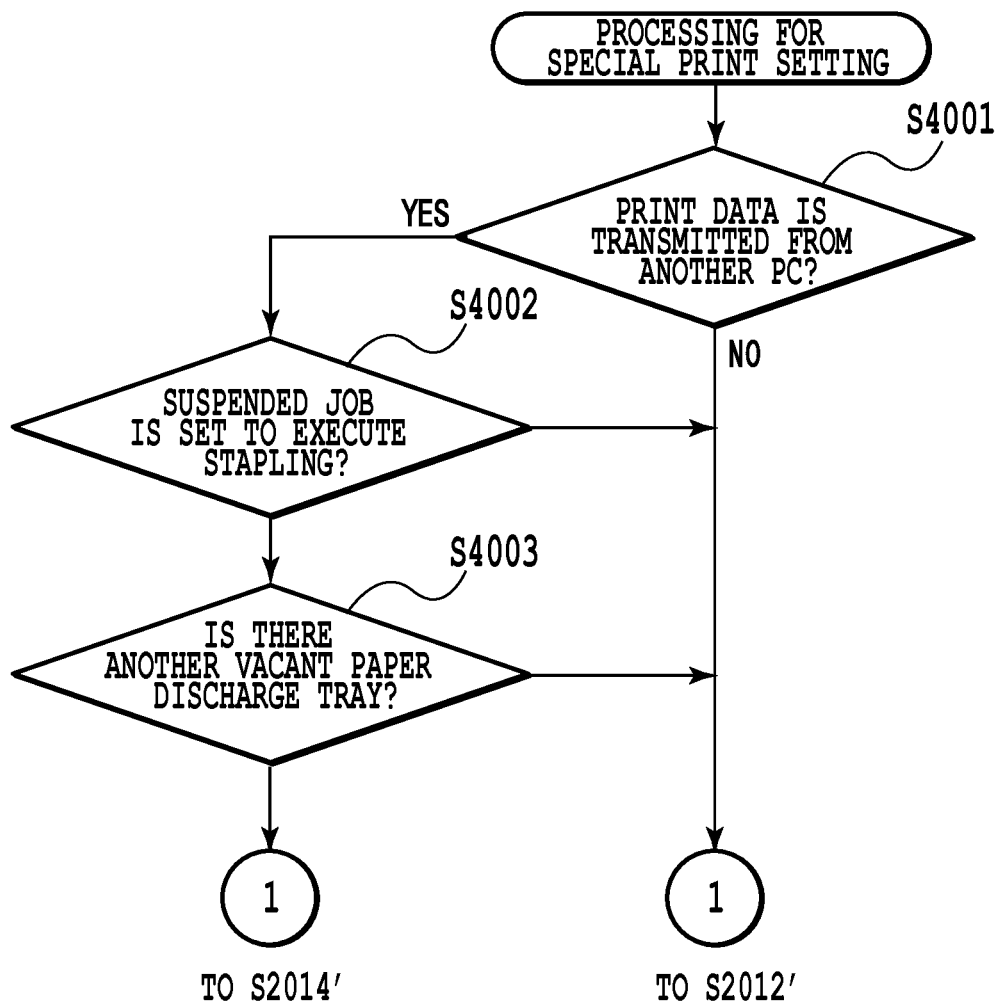
FIG. 10 is another flowchart of the image processing device in the fourth embodiment.

FIG. 10 is a flowchart showing an example of the processing in step S4000 in FIG. 9.

First, an assumption is made that the network interruption occurs on the external device 101 side in the course of transmitting the print data 109 from the external device 101 to the image processing device 102. Thereafter, in step S4001, the image processing device 102 determines whether or not the print data 104 are transmitted from another external device (not shown) to the image processing device 102 before the recovery of the network connection.

The process proceeds to step S2012' when the image processing device 102 determines in step S4001 that the print data 104 are not transmitted from the other external device (not shown).

The process proceeds to step S4002 when the image processing device 102 determines in step S4001 that the print data 104 are transmitted from the other external device (not shown).

In step S4002, the image processing device 102 determines whether or not the print setting of the print data 104 incompletely transmitted from the external device 101 before the network interruption is directed to start printing after the image processing device 102 receives all the print data.

Here, the setting directed to start printing after the image processing device 102 receives all the print data is a print setting that requires stapling and punching, for example.

The process proceeds to step S2012' when a determination is made in step S9002 that the print setting of the print data 109 incompletely transmitted from the external device 101 before the network interruption is not directed to start printing after the image processing device 102 receives all the print data.

On the other hand, the process proceeds to step S4003 when a determination is made in step S4002 that the print setting of the print data 104 incompletely transmitted from the external device 101 before the network interruption is directed to start printing after the image processing device 102 receives all the print data.

In step S4003, the image processing device 102 determines whether or not there is any vacant paper discharge tray other than a paper discharge tray used for discharging paper for the print data 104 incompletely transmitted from the external device 101 to the image processing device 102 before the network interruption. This determination may be made by detecting a vacant paper discharge tray with an unillustrated sensor included in the image processing device 102, for example.

The process proceeds to step S2012' when a determination is made in step S4003 that there is a vacant paper discharge tray.

On the other hand, the process proceeds to step S2014' when a determination is made in step S4003 that there is no vacant paper discharge tray.

In other words, this interrupted print job will be removed in a case where the print processing from the other external device is performed during the network interruption, where there are no vacant paper discharge tray, and where the process which cannot be performed without all the print data is directed to the interrupted print job.

According to the above-described processing, it is possible to switch the processing after reconnection of the network appropriately by the setting of the print data 104 when the print processing from another external device (not shown) takes place during the network interruption. In this way, the image processing device 102 is able to perform printing of the print data 104 from the other external device (not shown) properly.

Fifth Embodiment

A printing system according to a fifth embodiment is similar to the printing system of the first embodiment. In the following, the fifth embodiment will be described with reference to a flowchart shown in FIG. 11.

Figure 11B:
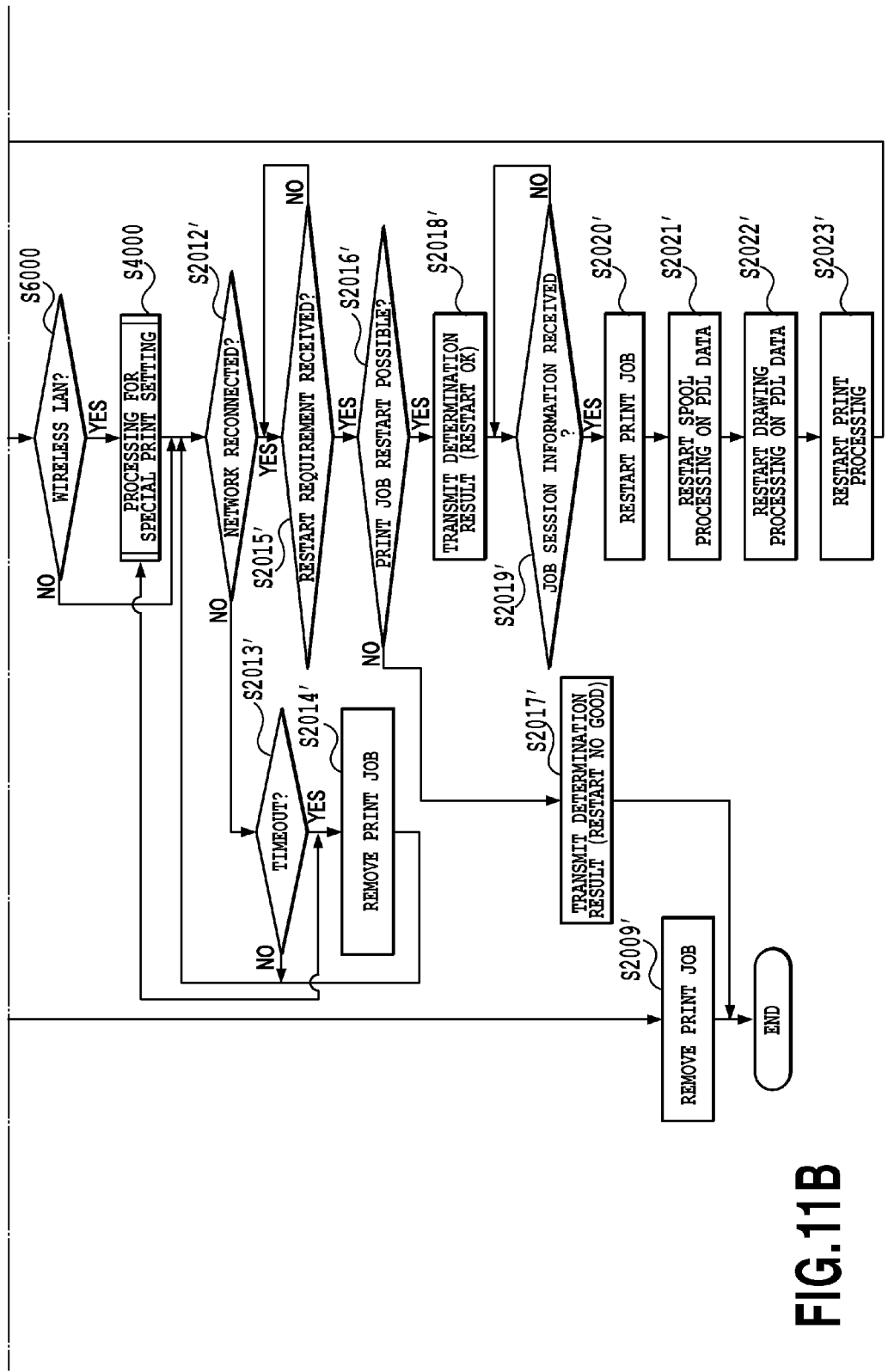
FIG. 11B is a flowchart of an image processing device in the fifth embodiment.

FIG. 11 is arranged by adding, to the flowchart in FIG. 4, processing to cause the image processing device 102 to determine whether or not it is appropriate to perform the processing in step S3000 and step S4000 depending on a network environment. Of the processing illustrated in FIG. 11, the processings other than step S3000, step S4000, step S5000, and step S6000 are the same as those shown in FIG. 4.

In step S5000, the image processing device 102 determines whether or not transmission of the print data 104 from the external device 101 to the image processing device 102 is performed via the network 103 utilizing a wireless LAN.

The process proceeds to step S3000 when a determination is made in step S5000 that the transmission of the print data 104 is performed via the network 103 utilizing the wireless LAN. The contents of the processing in step S3000 are the same as those shown in the flowchart in FIG. 8.

On the other hand, the process proceeds to step S2006' when a determination is made in step S5000 that the transmission of the print data 104 is not performed via the network 103 utilizing the wireless LAN.

Meanwhile, concerning step S6000, the image processing device 102 determines whether or not the transmission of the print data 104 from the external device 101 to the image processing device 102 is performed via the network 103 utilizing the wireless LAN as similar to step S5000.

The process proceeds to step S4000 when a determination is made in step S6000 that the transmission of the print data 104 is not performed via the network 103 utilizing the wireless LAN.

On the other hand, the process proceeds to step S2012' when a determination is made in step S6000 that the transmission of the print data 104 is performed via the network 103 utilizing the wireless LAN.

According to the above-described processing, when the other external device (not shown) is to perform printing in the course of the interruption of the network 103, the image processing device 102 is able to switch the processing after reconnection properly in an environment having a relatively higher probability of interruption than a wired LAN, such as in the wireless LAN environment. Therefore, it is also possible to perform the processing of the print data 104 from the other external device (not shown).

In this embodiment, the determination is made as to whether the print job subjected to interruption of processing due to the interruption of the network 103 is transmitted through the wireless LAN or not. However, concerning the performed printing operation from the other external device (not shown), it is needless to say that the image processing device 102 is able to perform another printing operation from still another external device (not shown) similarly by determining whether or not such a printing operation is transmitted via the wireless LAN.

Other Embodiments

Aspects of the present invention can also be realized by a computer of a system or device (or devices such as a CPU or MPU) that reads out and performs a program recorded on a memory device to perform the functions of the above-described embodiment (s), and by a method, the steps of which are performed by a computer of a system or device by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-099045, filed Apr. 15, 2009, which is hereby incorporated by reference herein in its entirety.

What is claimed is:

1. An image processing device comprising:
a receiving unit for receiving print data transmitted from an external device connected through a network;
a detecting unit for detecting interruption of connection of the network while the receiving unit receives the print data;
a setting determining unit for determining, before the detecting unit detects the interruption of the network, whether or not a print setting of the print data is a setting directed to start printing after all the print data are received, the image processing device being capable of receiving data failed to be received due to the interruption, among the print data supposed to be received, upon a reconnection of the network whose interruption has been detected, wherein, when the setting determining unit determines that the print setting of the print data is the setting directed to start printing after all the print data are received, print processing on the print data is started after all the print data are received; and
a determining unit for making a determination for a case where the print setting of the print data incompletely transmitted from the external device before the interruption of the network is the setting directed to start printing after all the print data are received, where the interruption of the network connected to the external device has been detected, and where a print job from a different external device connected through a different network is transmitted, the determination being made as to whether or not there is a vacant paper discharge tray in addition to a paper discharge tray used for discharging the print data transmitted incompletely before the interruption of the network, wherein, when the determining unit determines that there is a vacant paper discharge tray, the print job from the different external device connected through the different network is discharged onto the vacant paper discharge tray.

2. The image processing device according to claim 1, wherein the setting directed to start printing after all the print data are received is a print setting requiring any of stapling and punching.

3. An image processing method executed by an image processing device, the method comprising:
a receiving step of receiving print data transmitted from an external device connected through a network;
a detecting step of detecting interruption of connection of the network while the receiving step receives the print data, wherein the receiving step is capable of receiving data failed to be received due to the interruption, among the print data supposed to be received, upon a reconnection of the network whose interruption has been detected;
a setting determining step of determining, before the detecting step detects the interruption of the network, whether or not a print setting of the print data is a setting directed to start printing after all the print data are received, wherein, when the setting determining step determines that the print setting of the print data is the setting directed to start printing after all the print data are received, print processing on the print data is started after all the print data are received; and
a determining step of making a determination for a case where the print setting of the print data incompletely transmitted from the external device before the interruption of the network is the setting directed to start printing after all the print data are received, where the interruption of the network connected to the external device has been detected, and where a print job from a different external device connected through a different network is transmitted, the determination being made as to whether or not there is a vacant paper discharge tray in addition to a paper discharge tray used for discharging the print data transmitted incompletely before the interruption of the network, wherein, when the determining step determines that there is a vacant paper discharge tray, the print job from the different external device connected through the different network is discharged onto the vacant paper discharge tray.

4. A non-transitory computer-readable storage medium on which is stored code of a computer executable program for causing an image processing device to execute a process comprising:

a receiving step of receiving print data transmitted from an external device connected through a network;

a detecting step of detecting interruption of connection of the network while the receiving step receives the print data, wherein the receiving step is capable of receiving data failed to be received due to the interruption, among the print data supposed to be received, upon a reconnection of the network whose interruption has been detected;

a setting determining step of determining, before the detecting step detects the interruption of the network, whether or not a print setting of the print data is a setting directed to start printing after all the print data are received, wherein, when the setting determining step determines that the print setting of the print data is the setting directed to start printing after all the print data are received, print processing on the print data is started after all the print data are received; and a determining step of making a determination for a case where the print setting of the print data incompletely transmitted from the external device before the interruption of the network is the setting directed to start printing after all the print data are received, where the interruption of the network connected to the external device has been detected, and where a print job from a different external device connected through a different network is transmitted, the determination being made as to whether or not there is a vacant paper discharge tray in addition to a paper discharge tray used for discharging the print data transmitted incompletely before the interruption of the network, wherein, when the determining step determines that there is a vacant paper discharge tray, the print job from the different external device connected through the different network is discharged onto the vacant paper discharge tray.

* * * * *